Sept. 10, 1968    DHU AINE J. DAVIS    3,401,255
ELECTRIC SOLDER GUN TIP
Filed Oct. 21, 1965
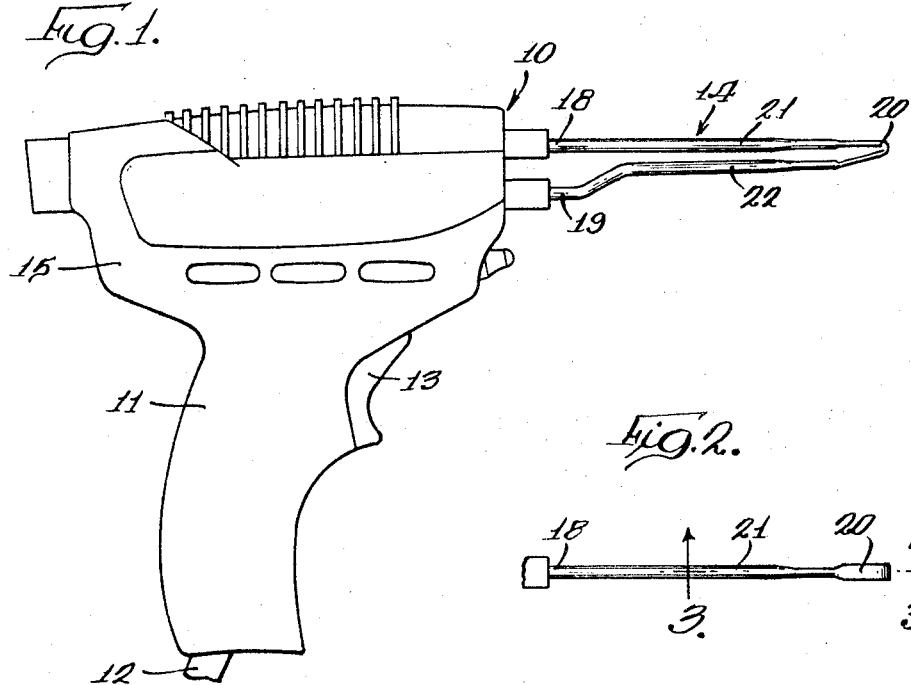
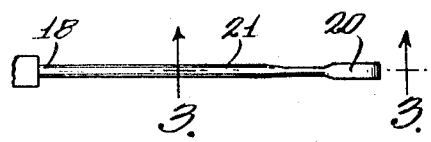
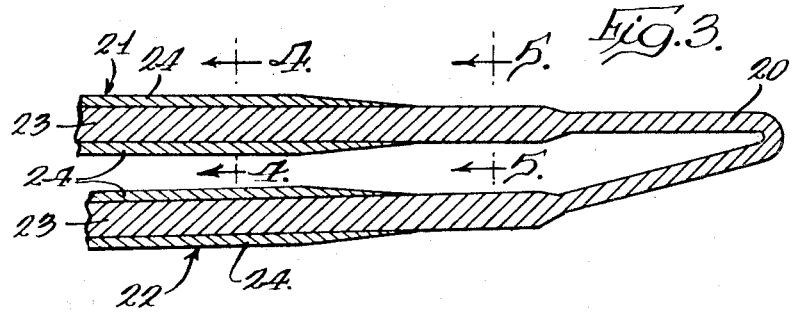
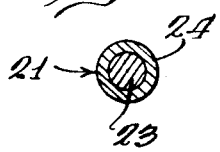
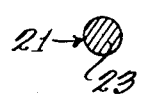
Inventor
Dhu Aine J. Davis
By Hofgren, Wegner,
Allen, Stellman & McCord
Atty's United States Patent Office 3,401,255
Patented Sept. 10, 1968

3,401,255
ELECTRIC SOLDER GUN TIP
Dhu Aine J. Davis, Wheaton, Ill., assignor to D. J. Davis Company, Inc., a corporation of Connecticut
Filed Oct. 21, 1965, Ser. No. 499,808
1 Claim. (Cl. 219—233)

ABSTRACT OF THE DISCLOSURE

A soldering gun tip in which an elongated copper clad steel conductor of V-shaped conformation has legs of circular cross section and a looped intermediate section which converges at a generally uniform angle to a point which forms the apex of the V. The looped section is flattened transversely to the plane of the V to a width greater than diameter of the legs to enhance the solder holding ability of the tip and to provide a larger heat transfer surface. The copper cladding layer is removed from the looped section to concentrate the generation of heat to the looped section.

---

One conventional soldering tool, commonly known as a "soldering gun," is a device generally resembling a pistol wherein a soldering tip or heating element conforms generally to the barrel of the pistol and is rigidly mounted on a pistol type grip which contains a control switch for energizing the heating element. In soldering tools of the above type, the soldering tip normally comprises a U-shaped conductor which is electrically connected in circuit with a step-down transformer and the U-shaped tip is a resistance element for developing relatively large amounts of heat therein to form the heating element for the soldering gun. It is known to provide soldering gun tips which are preferably made wholly of copper so that the metal tip is a good heat and electric conductor. Often the legs of the U-shaped tip are made of copper and the loop of the tip is either reduced in cross section so that the heat is concentrated at the end portion thereof, or the loop is fashioned by a piece of high electrically resistant material and fixed attachingly to the ends of the copper legs. The disadvantage of a wholly copper soldering tip is its oxidation when subjected to high heat for extended periods of time, and the thinner the cross section at the reduced end portion, the greater is the oxidation. Although soldering tips which employ copper only for the legs and a higher resistant material with lower oxidation tendencies at the loop of the tip, solve the oxidation problem, legs made wholly of copper have the disadvantage of not providing the rigidity and durability required of such tips. By employing a more rigid and durable material, such as steel, in the legs of the tip, the desired conductivity is lost. The present invention has for its purpose, the provision of a soldering tip which overcomes this dilemma.

It is an object of this invention to provide a tip for soldering guns which will have all the conductive advantages of a copper tip without the disadvantages of increased oxidation and inadequate rigidity and durability.

It is another object of this invention to provide a soldering tip for electric soldering guns wherein the legs of the tip are highly conductive, rigid and durable, and wherein the ends of the highly conductive legs are connected by means of a high electrically resistant portion, preferably in loop form, which has relatively low oxidation.

It is a further object of this invention to provide a tip for soldering guns which is comprised of an elongated sturdy and durable conductor having two ends and an intermediate section, and having a covering of a greater conductivity than the conductivity of the conductor and extending from the ends thereof to the intermediate section.

It is still a further object of this invention to provide a method by which such tips for soldering guns may be formed.

It is yet another object of this invention to provide a method of forming a heating element from a length of wire having a core of one conductivity and a clad covering of a greater conductivity, including the steps of removing the clad covering from an intermediate portion of the length of wire by grinding or the like and then forming the wire into a heating element having two legs of clad wire extending from the intermediate section of lesser conductivity.

It is another object of this invention to provide such a method which includes the step of flattening the intermediate section following removal of the clad covering.

More particularly, this invention relates to a soldering gun tip of a generally V-shaped conformation comprised of two legs and an intermediate hairpin loop. The tip is made of copper clad steel wherein the copper is removed at the loop portion thereof so that the loop comprises only the steel core to provide a loop of greater resistance than the legs as well as one having little tendency to oxidize. The provision of a steel core throughout the entire elongated tip provides the desired rigidity and durability for the legs and eliminates the undesirable oxidation at the loop portion. By having the legs of the soldering tip covered with copper, the desired high conductivity is achieved in the legs so as to concentrate the heat at the higher resistive intermediate loop portion.

Further features and advantages will readily be apparent from the following specification and from the drawings, in which:

FIG. 1 is an elevation view of a soldering gun with a tip embodying the invention;

FIG. 2 is a top plan view of the tip of the soldering gun of FIG. 1;

FIG. 3 is a sectional view taken generally along the line 3—3 of FIG. 2;

FIG. 4 is a sectional view taken generally along the line 4—4 of FIG. 3; and

FIG. 5 is a sectional view taken generally along the line 5—5 of FIG. 3.

For purposes of disclosure, the present invention is illustrated herein in combination with a soldering device 10 commonly known as a "soldering gun" having a pistol type grip or handle portion 11 which receives a conductor cord 12 and also mounts a trigger switch 13. The switch is the control means for energizing the novel soldering tip, shown generally as 14. The soldering gun includes a casing portion 15 which houses a step-down transformer to which the soldering tip or resistance element is electrically connected. The internal structure of the soldering gun, including the connections between the conductor cord, control switch, transformer and soldering tip, are not shown in the drawings for they may be comprised of many conventional structures presently available. The invention as herein illustrated lies in the new and improved soldering tip which forms the resistance or heating element of the soldering device.

Referring to FIG. 1, the novel soldering tip 14 of this invention generally includes an elongated conductor having two ends 18 and 19 and a forward intermediate section 20. In the illustrated form, the soldering tip is of a generally V-shaped conformation comprised of two legs 21 and 22 and joined together by a hairpin loop at the intermediate section 20. The conductor is generally circular in cross section and the intermediate loop portion is flattened transversely to the plane of the V-shaped tip. The intermediate work engaging portion is preferably flattened to provide a larger surface for heat transfer and to facilitate holding solder for deposit upon the work to be soldered.

As best seen in FIGS. 3 through 5, the elongated conductor comprising the soldering tip of this invention is comprised of a core 23 surrounded by covering 24. The covering is of a conductive material having a greater conductivity than the conductivity of the core and extends from the ends of the conductor to, but not including, the intermediate loop section. The core is of a harder, sturdier and more durable material. An example of such a structure is copper clad steel wherein the core is formed of strong and durable steel and the covering is formed of highly conductive copper. As best seen in FIG. 3, the outer covering of conductive material is removed, as by grinding, from the intermediate loop portion of the tip to provide a greater resistance to concentrate the heat at the forward loop section. It can be seen that by providing a core of relatively hard material (preferably steel), rigidity and durability inherently lacking in all-copper conductors are provided, while the leg portions are highly conductive by virtue of the covering of a greater conductivity (preferably copper). By removing the copper from the forward loop section, not only is the heat concentrated at the loop due to the greater resistance, but the undesirable oxidation inherent in copper tips is eliminated.

Thus it can be seen that I have provided a new and improved soldering tip for soldering devices, a tip which has all the conductivity advantages of copper while avoiding the oxidation disadvantages and the limitations on rigidity and durability inherent in tips comprised of softer copper material.

While I have shown and described certain embodiments of my invention, it is to be understood that it is capable of many modifications. Changes, therefore, in the construction and arrangement may be made without departing from the spirit and scope of the invention as disclosed in the appended claim.

I claim:

1. An electric heating element for soldering guns and the like, comprising: an integral elongated conductor of a generally V-shaped conformation having two legs and a looped intermediate section, said conductor being of a relatively tough material to provide rigidity and durability, said legs being generally circular in cross section and including a relatively soft covering having a greater conductivity than the conductivity of said conductor, said looped section being uncovered and converging at a generally uniform angle to a point which forms the apex of the V, said looped section being flattened on the interior of the loop generally transversely to the plane of said V for facilitating holding molten solder, and said looped section being wider than said legs for providing a larger surface area for the conduction of heat.

References Cited

UNITED STATES PATENTS

| 1,813,161 | 7/1931 | Helle | 219—233 |
| 2,570,762 | 10/1951 | Caliri | 219—235 X |
| 2,680,187 | 6/1954 | Anton | 219—235 |
| 2,745,939 | 5/1956 | Lenk | 219—235 X |
| 2,814,712 | 11/1957 | Fulmer | 219—235 X |

FOREIGN PATENTS

| 138,079 | 7/1950 | Australia. |
| 564,269 | 6/1957 | Italy. |

ANTHONY BARTIS, *Primary Examiner.*